(12) United States Patent  
Paul et al.

(10) Patent No.: US 8,086,234 B2  
(45) Date of Patent: Dec. 27, 2011

(54) BROADCAST HANDOFF BETWEEN COMMUNICATION NETWORKS

(75) Inventors: Lizy Paul, Cedar Rapids, IA (US); John V. Thommana, Cedar Rapids, IA (US)

(73) Assignee: Freescale Semiconductor, Inc., Austin, TX (US)

( * ) Notice: Subject to any disclaimer, the term of this patent is extended or adjusted under 35 U.S.C. 154(b) by 681 days.

(21) Appl. No.: 11/413,533

(22) Filed: Apr. 28, 2006

(65) Prior Publication Data

US 2007/0254659 A1 Nov. 1, 2007

(51) Int. Cl.
*H04W 36/00* (2009.01)
*H04W 4/00* (2009.01)

(52) U.S. Cl. ........ 455/436; 455/437; 455/439; 455/440; 455/441; 455/442; 455/432.1

(58) Field of Classification Search .......... 455/450–458, 455/127–128, 436–443
See application file for complete search history.

(56) References Cited

U.S. PATENT DOCUMENTS

| | | | |
|---|---|---|---|
| 6,373,828 B1 * | 4/2002 | Stewart et al. | 370/331 |
| 6,731,936 B2 | 5/2004 | Butler et al. | |
| 7,283,782 B2 * | 10/2007 | Sinnarajah et al. | 455/3.01 |
| 2006/0138331 A1 * | 6/2006 | Guillebaud et al. | 250/359.1 |
| 2006/0234708 A1 * | 10/2006 | Aaltonen | 455/436 |
| 2006/0262793 A1 * | 11/2006 | Vare et al. | 370/390 |
| 2008/0032695 A1 * | 2/2008 | Zhu et al. | 455/442 |
| 2009/0185522 A1 * | 7/2009 | Periyalwar et al. | 370/328 |

FOREIGN PATENT DOCUMENTS

EP 1826953 A1 * 8/2007

* cited by examiner

*Primary Examiner* — Charles Appiah
*Assistant Examiner* — Emem Stephen

(57) ABSTRACT

Methods (400, 500) and corresponding systems (100) for handing off between a broadcast network and a cellular network include receiving, in a cooperation platform, incoming data from a content provider. Broadcast data corresponding to the incoming data is then sent to a broadcast network output for broadcasting to one or more subscribers including, a subscriber station. Handoff information from the cellular network is received in the cooperation platform, and, in response to the handoff information, cellular data corresponding to the incoming data is sent to a cellular network output for transmission to the subscriber station. The handoff information can correspond to a user request for handoff sent from the subscriber station via the cellular network, or can be a request for handoff sent from the cellular network based upon a loading level within one or more of the broadcast network and the cellular network.

14 Claims, 5 Drawing Sheets

BROADCAST HANDOFF BETWEEN COMMUNICATION NETWORKS

FIELD OF THE INVENTION

This invention relates in general to data communication, and more specifically to techniques and apparatus for performing a handoff between a broadcast network and a cellular network.

BACKGROUND OF THE INVENTION

DVB (digital video broadcasting) is a suite of internationally accepted open standards for broadcasting digital television. The standards are maintained by an industry consortium known as the DVB Project. The DVB standard is published by a Joint Technical Committee of the European Telecommunications Standards Institute (ETSI), and others.

DVB systems, and similar broadcast networks, distribute data by, for example, satellite, cable, terrestrial television, and terrestrial television for handheld devices. DVD-H is the specification for broadcasting to battery powered handheld devices. This specification, along with a set of related specifications for IP datacast (DVB-IPDC), are key enabling technologies for mobile television.

DVB-H is largely based on the successful DVB-T specification for digital terrestrial television, with additional features designed to account for the limited battery life of small handheld devices, and the particular environment in which such receivers must operate.

DVB-H uses high bandwidth channels with high transmission speeds in order to provide a wide selection of high quality TV services to mobile users. There is no limit to how many people can receive the content within the coverage area. Such broadcasting is known as "one-two-many" broadcasting, and is a cost-effective means of delivering content media to large audiences, compared to one-to-one delivery over, for example, a cellular network, where the data is sent separately to each recipient.

Recently, cellular telephone manufacturers have added DVB receivers to a cellular phone so that the cell phone user can receive both digital video broadcasts and cellular phone and data services on a single mobile device. The combination of such devices provides opportunities for integrated or cooperating services provided to the mobile device user. However, these two network technologies are currently stand-alone technologies and have little or no inter-working capabilities defined.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages, all in accordance with the present invention.

DETAILED DESCRIPTION

Figure 1:
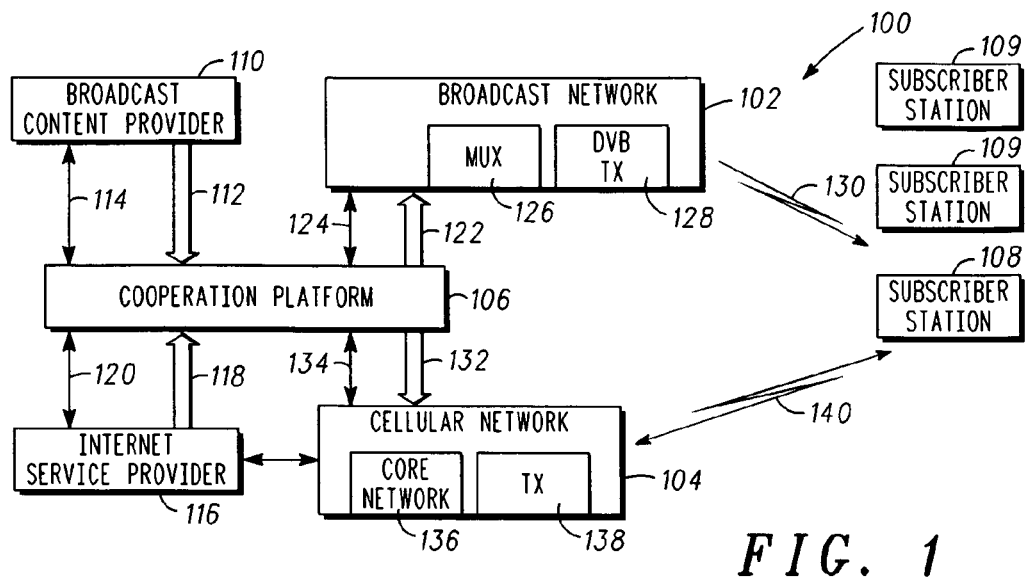
FIG. 1 depicts, in a simplified and representative form, a high-level block diagram of a communications system having a broadcast network and a cellular network, which are integrated by a cooperation platform in accordance with one or more embodiments.

In overview, the present disclosure concerns handing off data transmissions between a broadcast network and a cellular network. More particularly various inventive concepts and principles embodied in methods and apparatus may be used for handing off a data transmission between a broadcast network and a cellular network based upon a plurality of triggering events occurring in the network or in a multi-mode subscriber station of the communications system.

While the inter-network handoff system of particular interest may vary widely, one embodiment may advantageously be used in a wireless communication system, or a wireless networking system, having a direct broadcast wireless transmitter and a cellular wireless network operating according to one or more respective standards. For example, such a direct broadcast wireless transmitter can operate according to the DVB broadcast standard, while the cellular network can operate according to various standards, such as the 3rd Generation Partnership Project (3GPP) and 3GPP2 standards, or the like. Additionally, the inventive concepts and principles taught herein can be advantageously applied to other wireless communications systems wherein one system has a downlink-only transmission, and the other system supports bidirectional (i.e., uplink and downlink) transmissions.

The instant disclosure is provided to further explain, in an enabling fashion, the best modes, at the time of the application, of making and using various embodiments in accordance with the present invention. The disclosure is further offered to enhance an understanding and appreciation for the inventive principles and advantages thereof, rather than to limit the invention in any manner. The invention is defined solely by the appended claims, including any amendments made during the pendency of this application, and all equivalents of those claims as issued.

It is further understood that the use of relational terms, if any, such as first and second, top and bottom, and the like, are used solely to distinguish one entity or action from another without necessarily requiring or implying any actual such relationship or order between such entities or actions.

Much of the inventive functionality and many of the inventive principles may be implemented with, or in, integrated circuits (ICs), including possibly application specific ICs, or ICs with integrated processing controlled by embedded software or firmware. It is expected that one of ordinary skill—notwithstanding possibly significant effort and many design choices motivated by, for example, available time, current technology, and economic considerations—when guided by the concepts and principles disclosed herein will be readily capable of generating such software instructions and programs and ICs with minimal experimentation. Therefore, in the interest of brevity and minimizing any risk of obscuring the principles and concepts according to the present invention, further discussion of such software and ICs, if any, will be limited to the essentials with respect to the principles and concepts of the various embodiments.

Referring to FIG. 1, there is depicted, in a simplified and representative form, a high-level block diagram of communications system 100, which includes broadcast network 102 and another network, e.g., cellular network 104, and cooperation platform 106, in accordance with one or more embodiments. Broadcast network 102 generally represents one or more broadcast transmitters and the associated control and support systems (all connected via various communication links) that are necessary to retrieve service data for transmission and properly authenticate, bill, and wirelessly deliver service data to subscriber stations 108 and 109. Cellular network 104 generally represents one or more transceivers and the associated control and support systems (all connected via various communication links) that are necessary to provide bidirectional wireless data communication with subscriber stations 108 and 109. Thus, cellular network 104 is one embodiment of a bidirectional network.

Cooperation platform 106 receives "service data" and transfers the service data to broadcast network 102, or cellular network 104, or to both, so that it may be further transmitted to subscriber station 108. Service data, in general, is data that is sent to the subscriber station as part of a service provided to the user. Examples of such services include streaming programs or television channels, audio channels, or streaming data, such as stock market quotes. As with a radio or television signals broadcast over the public airwaves, service data can be broadcast without charge according to a schedule set by the service provider. Alternatively, the service data can be requested by the user and transmitted upon demand. The user can pay for a subscription to a service that allows authorized access to service data, wherein the user is authenticated before being able to receive and decode the service data. Service data can also be referred to as broadcast content.

Service data is typically provided by a content provider, such as broadcast content provider 110 shown in FIG. 1. Broadcast content provider 110 can be a television station, movie studio, music recording company, or any such entity that owns, creates, or distributes audio, video, or data content for broadcast from broadcast network 102 or other similar networks or distribution means. Thus, broadcast content provider 110 is configured and adapted to store digital content, and deliver such digital content via a data channel, which is typically a high speed broadband network connection, but can be another type of connection, e.g., satellite or wireless network.

Broadcast content provider 110 can be coupled to an input of cooperation platform 106 by service data channel 112. While many kinds of data channels can be used to implement service data channel 112, it is typically a broadband channel, which can be used to carry high resolution video or audio signals. A control channel 114 between broadcast content provider 110 and cooperation platform 106 can be used to send control signals, which, for example, can communicate requests for service data, or signals to authorize payment, or signals to start and pause the service data, or other similar signals. It should be understood that service data channel 112 can carry several programs simultaneously, so that the same, or different, service data can be provided to the several users of the subscriber stations, such as subscriber stations 108 and 109, simultaneously. Thus, one subscriber station can be playing or listening to one program, while another subscriber station is watching or listening to another program.

In some embodiments, the service data can be provided by a source other than broadcast content provider 110, such as internet service provider 116, which can be coupled to cooperation platform 106 via service data channel 118 and control channel 120. Internet service provider 116 can, for example, provide a source of streaming video, or music, or other data that is available to the user. Internet service provider 116 can retrieve service data from other providers or storage facilities via the Internet. Although cooperation platform has been shown with multiple input channels 112, 114, 118, and 120, such inputs can be individually or collectively referred to as a service data input of cooperation platform 106.

Cooperation platform 106 can be coupled to broadcast network 102 via broadcast data channel 122 and broadcast control channel 124. Within broadcast network 102, data received and controlled via channels 122 and 124 can be multiplexed and otherwise formatted and prepared for transmission by multiplexer 126. Following such multiplexing and processing, data is transmitted to subscriber station 108 by broadcast network transmitter 128. The transmitted signal travels via wireless channel 130 to subscriber station 108, and to perhaps many other similar subscriber stations 109 via different wireless channels.

Broadcast network transmitter 128 is a downlink only transmitter, which is also known as a one-two-many transmitter. It provides a one way transmission to subscriber stations 108 and 109. In one embodiment, broadcast network transmitter 128 can be a DVB-H/T transmitter, or other similar transmitter, that transmits digital television, audio, and data services. In other embodiments, broadcast network transmitter 128 can transmit other types of data.

Cellular network 104 is also coupled to cooperation platform 106 by cellular data channel 132 and cellular control channel 134. In one embodiment, cellular data channel 132 is adapted to transfer service data (which has been received from broadcast content provider 110 or internet service provider 116) to cellular network 104, with the same data speed and capacity as service data channel 112, or with a reduced data speed and capacity, as needed. Note that cellular network 104 can be more generally interpreted as a bidirectional wireless data network.

As a part of cellular network 104, core network 136 performs switching functions and manages communications between subscriber stations 108 and 109 and the Public Switched Telephone Network (PSTN). Core network 136 can also provide packet-switched data services, wherein core network 136 receives and processes data from the Internet and cellular data channel 132 and cellular control channel 134, and prepares all such data (e.g., voice, packets, service data, etc . . . ) for transmission from cellular transceiver 138 to subscriber station 108, via wireless channel 140. Core network 136 can also process data received from subscriber station 108, process billing and authentication information, perform power control processing for various subscriber stations 108, and perform various other overhead functions typically performed in a cellular network.

Because cellular transceiver 138 can transmit data to, and receives data from, subscriber station 108 (and interface similarly with other subscriber stations 109), subscriber station 108 is able to transmit data and control information to cellular network 104 to access, request, and control the transmission of service data to subscriber station 108, wherein cooperation platform 106 processes and directs the flow of such service data and control signals to and from broadcast content provider 110 or Internet service provider 116.

Figure 2:
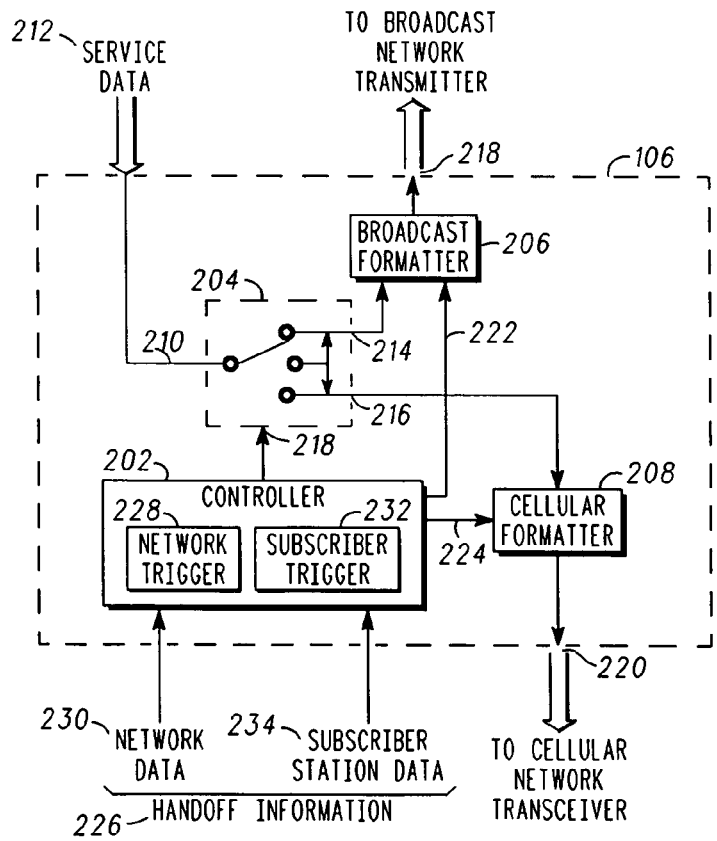
FIG. 2 is a representative block diagram of a cooperation platform in accordance with one or more embodiments.

With reference now to FIG. 2, there is depicted a representative block diagram of cooperation platform 106 in accordance with one or more embodiments. Cooperation platform 106 includes controller 202, which is coupled to switch 204, broadcast formatter 206, and cellular formatter 208. Switch 204, which is a device for directing data from one or more inputs to various outputs either exclusively or simultaneously, has an incoming data input 210 that receives service data 212, where the service data can be from either broadcast content provider 110 or Internet service provider 116 (see FIG. 1). Switch 204 has broadcast data output 214 for sending data to broadcast network 102, and cellular data output 216 for sending data to cellular network 104. Switch control input 218 receives control signals from controller 202 to control or select the flow of data through switch 202, from incoming data input 210 to broadcast data output 214 or cellular data output 216, or both.

Cooperation platform 106 has a broadcast network output 218 for sending data to broadcast network 102 via broadcast data channel 122 (see FIG. 1.), and a cellular network output 220 for sending data to cellular network 104 via cellular data channel 132. In some embodiments, broadcast data output 214 can be coupled directly to broadcast network output 218, and cellular data output 216 can be coupled directly to cellular network output 220. In another embodiment, broadcast data output 214 can be coupled indirectly to broadcast network output 218 via broadcast formatter 206, and cellular data output 216 can be coupled indirectly to cellular network output 220 via cellular formatter 208. Both broadcast formatter 206 and cellular formatter 208 are configured and adapted to format data in response to control signals 222 and 224 from controller 202, respectively. Examples of such data formatting can include changing the frame rate of a streaming video signal, changing the resolution of a video signal, changing the sample rate of an audio signal, changing the encoding, encryption, or error correction scheme of streaming real-time data, or other similar formatting changes.

In one embodiment, controller 202 includes software programs, firmware, or logic devices adapted to receive and respond to handoff information 226 received via cellular control channel 134 from cellular network 104 (see FIG. 1). Handoff information 226 is data related to deciding whether to handoff a data stream being transmitted from broadcast network 102 so that it is transmitted from cellular network 104, or vice versa. Handoff information 226 can also include data or instructions that can postpone or avoid the need for a handoff, such as data related to improving signal strength or signal robustness, or data related to saving battery power in subscriber station 108.

The responses of controller 202 to handoff information 226 include performing a handoff of service data by sending instructions to reconfigure switch 204, or instructing formatters 206 or 208 to reformat data. For example, network trigger software 228 can receive and respond to network data 230, which is handoff information generated in cellular network 204 and generally related to the status of cellular network 104. Subscriber trigger software 232 can receive and respond to subscriber station data 234, which is handoff data generated in, and more specifically related to, the status of subscriber station 108.

Figure 3:
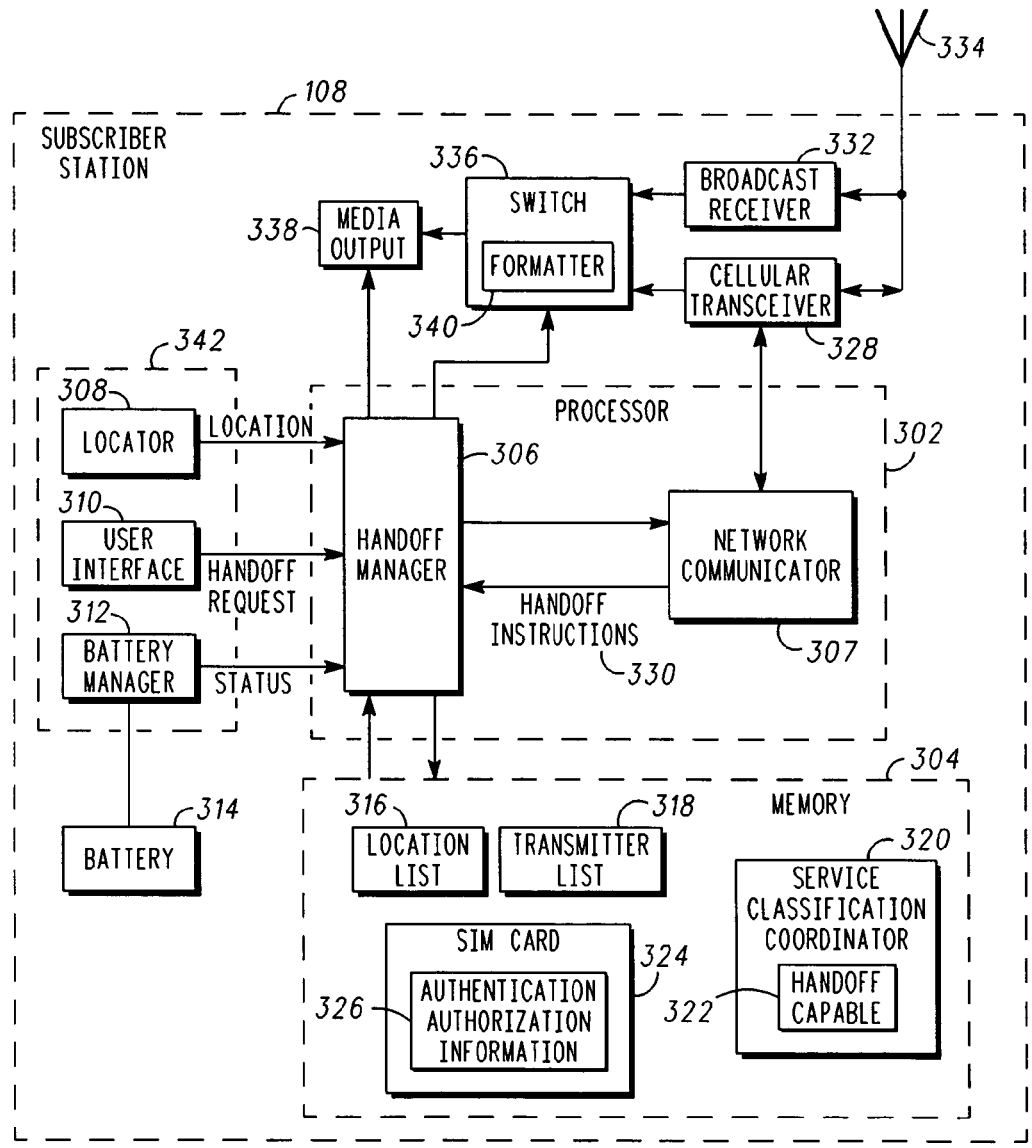
FIG. 3 depicts a schematic representation of a subscriber station in accordance with one or more embodiments.

With reference now to FIG. 3, there is depicted a schematic representation of a subscriber station—such as subscriber station 108, or another similar subscriber station—that can be used in accordance with one or more embodiments. Subscriber station 108 can include processor 302, which is coupled to memory 304. Memory 304 can contain programs or other software instructions that implement functions or processes that are executed within processor 302. For example, one such process is handoff manager 306, and another is network communicator 307, either of which can be implemented in software, firmware, hardware, or some combination thereof.

Handoff manager 306 collects and processes data related to decisions concerning handoffs between broadcast network 102 and cellular network 104 (see FIG. 1.). This collected data may be referred to as "handoff information." In the embodiment shown, examples of handoff information come from locator 308, user interface 310, and battery manager 312, which monitors the status of battery 314, and the rate of power consumption under various modes of operation. Handoff data from locator 308 can include the location of the subscriber unit (which can be determined from GPS coordinates, cell site IDs, etc . . . ), which data can be useful in identifying or anticipating coverage areas having weak signal strength. Handoff data from user interface 310 (which can also be referred to as a user input device) can include an indication that the user has pushed a handoff button in order to request, or indicate a desire for, a user-initiated handoff between the broadcast transmitter and the cellular transceiver (e.g., bidirectional network transceiver).

Handoff data from battery manager 312 can include a status of battery 314, where the status indicates a percentage of battery life remaining, a voltage, a power level, or other similar indication of remaining battery life. In order to make more intelligent handoff decisions, battery manager 312 can also monitor power consumption under various modes of operation. A power consumption metric can be calculated based on factors such as modulation parameters, coding format, compression schemes, security levels (i.e., encryption levels), and various modes of cellular telephone operation. When the battery discharges below a preselected level, battery manager 312 can determine whether there is a mode of operation available that consumes power at a lower rate. For example, after the battery has been discharged past the ½ capacity level, battery manager 312 can determine that the modulation should be changed from 64 quadrature amplitude modulation (QAM) to 32 QAM, and that the frame rate should be reduced from 30 frames per second (fps) to 20 fps.

Besides storing program code for processor 302, memory 304 can also store data lists, authentication information, and other information about subscriber station 108 that is used to make a handoff or a handoff decision. More specifically, location list 316 can store a list or descriptions of locations in the coverage area having poor signal strength, or no signal strength. This list can be periodically compared with location handoff information generated by locator 308 so that timely handoffs can be requested automatically based on the location of subscriber station 108.

Transmitter list 318 can include information regarding the location of broadcast or cellular transmitters (i.e., transmitters 128 or transceivers 138 of FIG. 1.). This list can be used to make decisions regarding handoffs. Transmitter list 318 can also include data regarding the capabilities or configurations of various transmitters, or the types of services available from various transmitters. This information may be useful when deciding to handoff subscriber station 108.

Service classification coordinator 320 is memory that can be used to store data that describes the various data receiving capabilities and handoff capabilities of subscriber station 108. Examples of handoff capable data 322 can include data that indicates that subscriber station 108 is capable of a handoff between broadcast network 102 and cellular network 104. Service classification coordinator 320 can include data or software programs that help subscriber station 108 negotiate with cellular network 104 the types of handoffs that will be permitted and the protocols that will be used to initiate the handoff.

SIM card 324, which is a removable memory card, can be used to store authentication and authorization information 326, which information may be used to access and/or pay for data services. SIM card 324 can also store a decryption key for decoding encoded service data.

Network communicator 307—which can be implemented in software, firmware, hardware, or some combination thereof—receives, processes, formats, and sends messages to and from cellular transceiver 328. Thus, network communicator 307 is coupled to handoff manager 306 for receiving handoff information, and formatting such information into messages that can be sent by cellular transceiver 328 to cellular network 104. Network communicator 307 can also receive messages from cellular transceiver 328, and send such messages to handoff manager 306. For example, handoff instructions 330 can be sent from network communicator 307 to handoff manager 306. Such handoff instructions 330 can inform handoff manager 306 how and when to initiate a handoff in subscriber station 108.

Broadcast receiver 332 allows subscriber station 108 to receive direct broadcast services from broadcast network 102. Both broadcast receiver 332 and cellular transceiver 328 have inputs coupled to antenna 334 for receiving radio frequency signals, and both have outputs coupled to switch 336. Switch 336 selects data coming from broadcast receiver 332 or cellular transceiver 328, or both, and sends such selected data, via a switch output, to media output device 338. Thus, switch 336 is one embodiment of a data directing processor, which receives data at an input and directs data to one or more outputs. Switch 336 can also have a formatter 340 that is adapted to reformat data received from either broadcast receiver 322 or cellular transceiver 328 into a format that can be displayed or otherwise output to the user by media output device 338.

In one embodiment, media output device 338 is a display screen and a speaker for outputting audiovisual service data. Other media output devices 338 can be audio only, video only, or another data output device, such as a data port for outputting, from subscriber station 108, data transmitted from a service data provider. This data port can include a USB (Universal Serial Bus) data port, or an Ethernet port, or other similar data ports.

Figure 4:
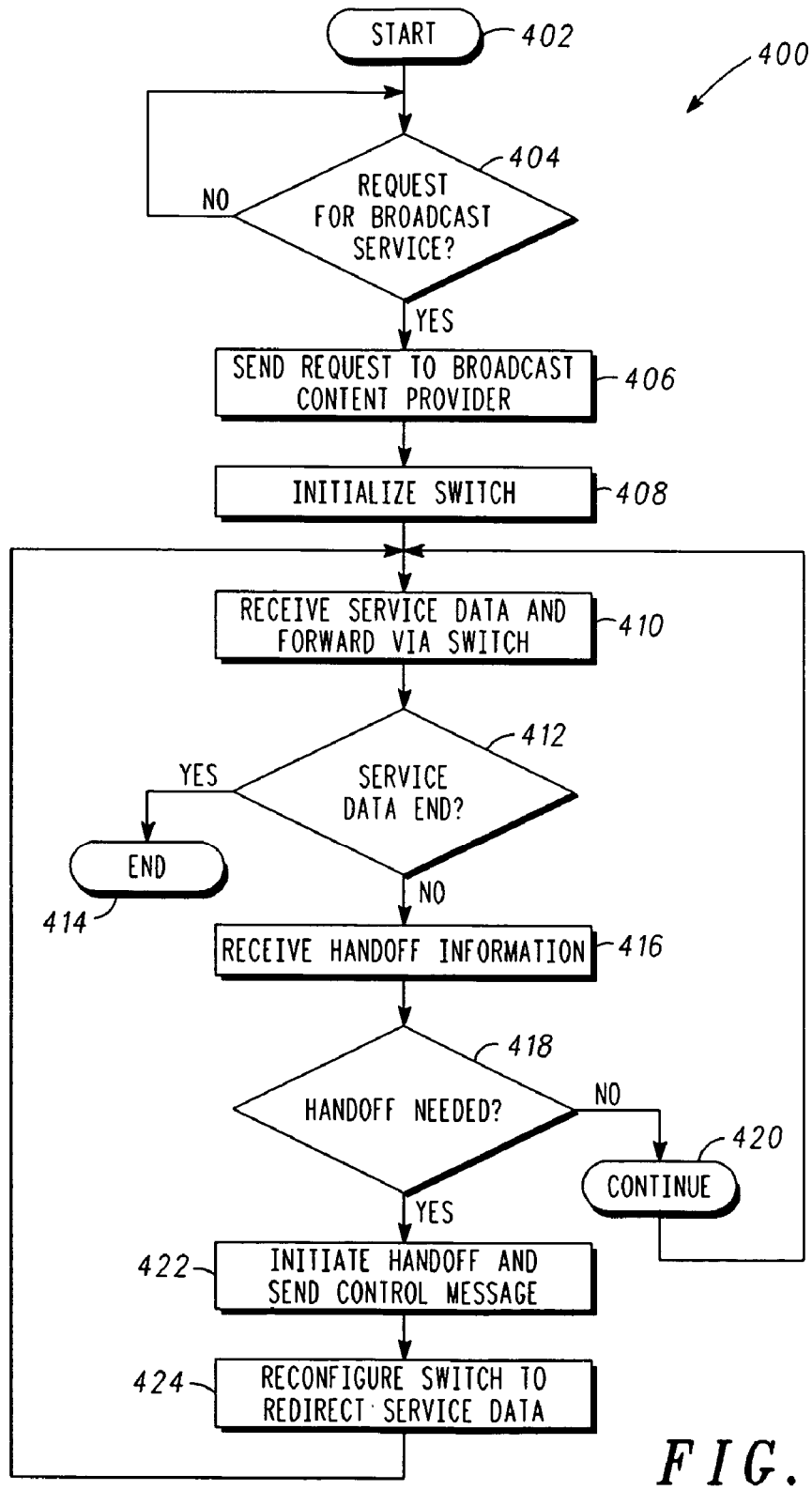
FIG. 4 shows a high-level flowchart of processes executed by a cooperation platform that can be used in conjunction with the FIG. 1 communications system in accordance with one or more embodiments.

Turning now to the operation of the cooperation platform, in FIG. 4 there is depicted a high-level flowchart 400 of exemplary processes executed by portions of a cooperation platform, such as cooperation platform 106, which is shown in data communications system 100 of FIG. 1, or executed by another similar apparatus, in accordance with one or more embodiments. As illustrated, the process begins at 402, and thereafter passes to 404 wherein the process determines whether a request for broadcast service has been received from a subscriber unit, such as subscriber unit 108. A request for broadcast service can include a request to begin broadcasting service data, such as a request for a movie, a request for a digital audio broadcast, a request for a data service such as streaming stock market quotes, or other similar requests made by entering a selection or a command into the user interface of subscriber unit 108.

If a request for broadcast service has not been received, the process iteratively returns to 404 to await a request for a broadcast service. If a request for a broadcast service has been received, the process sends a request, as shown at 406, from cooperation platform 106 to a broadcast content provider, such as broadcast for content provider 110, in order to initiate a data stream containing the requested broadcast service. Alternatively, the request can be sent to Internet service provider 116 if the service data resides there.

Before receiving service data, the process initializes the switch in the cooperation platform, as shown at 408. If the broadcast network is the preferred transmission method for the service data, the initialization can be implemented by setting switch 204 so that service 10 data 212 is sent to broadcast data output 214, where service data 212 will be forwarded to broadcast network 102 (see FIG. 2). Alternatively, switch 204 can be set to send data to cellular network 104 if, for some reason, the cellular network is the currently preferred method for transmitting the service data. In yet another embodiment, switch 204 can be initialized to send data to both broadcast data output 214 and cellular data output 216, so that service data will be transmitted by both the broadcast network and the cellular network. If both networks are transmitting the data, subscriber station 108 can select the best packet (i.e., the error free packet or the earliest packet) from either transmitter.

After initializing the switch, the process receives the service data and forwards the service data, via the switch, to the selected network for transmission to the subscriber station, as shown at 410. In some embodiments, switch 204 may send the data directly to broadcast network output 218. Alternatively, when the service data needs reformatting, switch 204 may send data to broadcast formatter 206, where it is reformatted before it is sent to broadcast network output 218. Formatter 206 can, for example, change the coding scheme to accommodate a particular video codec in subscriber station 108, or formatter 206 can change the frame rate so that subscriber station 108 uses less power to display or output the media represented by the service data.

Next, the process determines whether the service data has ended (e.g., the content of the service data has come to an end), as illustrated at 412. For example, if service data 212 is a movie, the movie can be at the end. If the service data has ended, the process terminates, as depicted at 414, whereafter the process can be repeated or restarted as required.

If the service data has not ended, the process can receive handoff information, as illustrated at 416. Handoff information is data used to make a decision to handoff the data stream of the service data between broadcast network 102 and cellular network 104 (in either direction). Handoff information 226 can include network data 230 generated in cellular network 104, or subscriber station data 234 generated in subscriber station 108, and sent to the cooperation platform via the cellular network.

For example, information generated in cellular network 104 can include data that indicates that cellular network 104 is nearing full capacity, and needs to handoff or transfer the transmission of service data to broadcast network 102 to relieve some of the traffic load. Or, as another example, cellular network 104 can calculate or determine the location of subscriber station 108, and request a handoff in anticipation of subscriber station 108 moving into an area of poor cellular network coverage.

Examples of handoff information generated in subscriber station 108 includes data indicating the location of subscriber station 108, data indicating the status of the power supply or battery in subscriber station 108, or data indicating that the user has requested a handoff by, for example, pressing a button on subscriber station 108. Having a handoff button on subscriber unit 108 is useful because often there is no quality feedback from subscriber station 108 to broadcast network 102 to indicate that the service data is being received with poor quality. Thus, as soon as the user sees or hears that a picture or audio is distorted (i.e., the audio sounds choppy, the picture is jumping because of delayed frames, the images are blurred, etc . . . ), the user may push the button that requests a handoff between networks. Note that humans are generally more tolerant of audio distortion than video distortion.

Next, the process determines whether a handoff is needed, e.g., based on the handoff information, as shown at 418. If the process determines that a handoff is not needed, the process continues to receive service data and forward the service data via the switch to the currently selected transmitter, as indicated at 420. If, however, the process determines that a handoff is needed, the process initiates the handoff and sends control messages to subscriber station 108 to coordinate the handoff, as shown at 422.

After sending the handoff control messages, the process redirects the broadcast content by reconfiguring switch 204 according to the type of handoff determined at 418. For example, if service data was initially broadcast via broadcast network 102, the process can reconfigure switch 204 to send service data 212 to cellular data output 216 for broadcasting via cellular network 104. Note that when service data 212 is handed off from broadcast network 102 to cellular network 104, cellular formatter 208 can be used to reformat service data 212 to match the bandwidth capacity of cellular network 104, and to match the encoding schemes used by transceiver 138 in cellular network 104.

After reconfiguring the switch to redirect the service data, the process iteratively returns to 410 to receive additional service data 212 and forward the service data according to the new setting of switch 204. Note that the process depicted in FIG. 4 can be executed each time a user requests a broadcast service. Portions of the process shown in FIG. 4, namely the loop from 410 to 424, are repeated iteratively, as the process continues to receive handoff information at 416 and reevaluate the need for another handoff. Thus, the process executed by cooperation platform 106 can begin receiving service data from broadcast network 102, then handoff the data stream to cellular network 104 while, for example, the signal strength through channel 130 is weak (as indicated by signal strength measurements, user input, current location correlated with coverage maps of known areas with low signal strength, or other similar techniques), and then handoff the data stream back to broadcast network 102 at some later time, perhaps when the user requests a handoff by pressing a button on the subscriber station.

Figure 5:
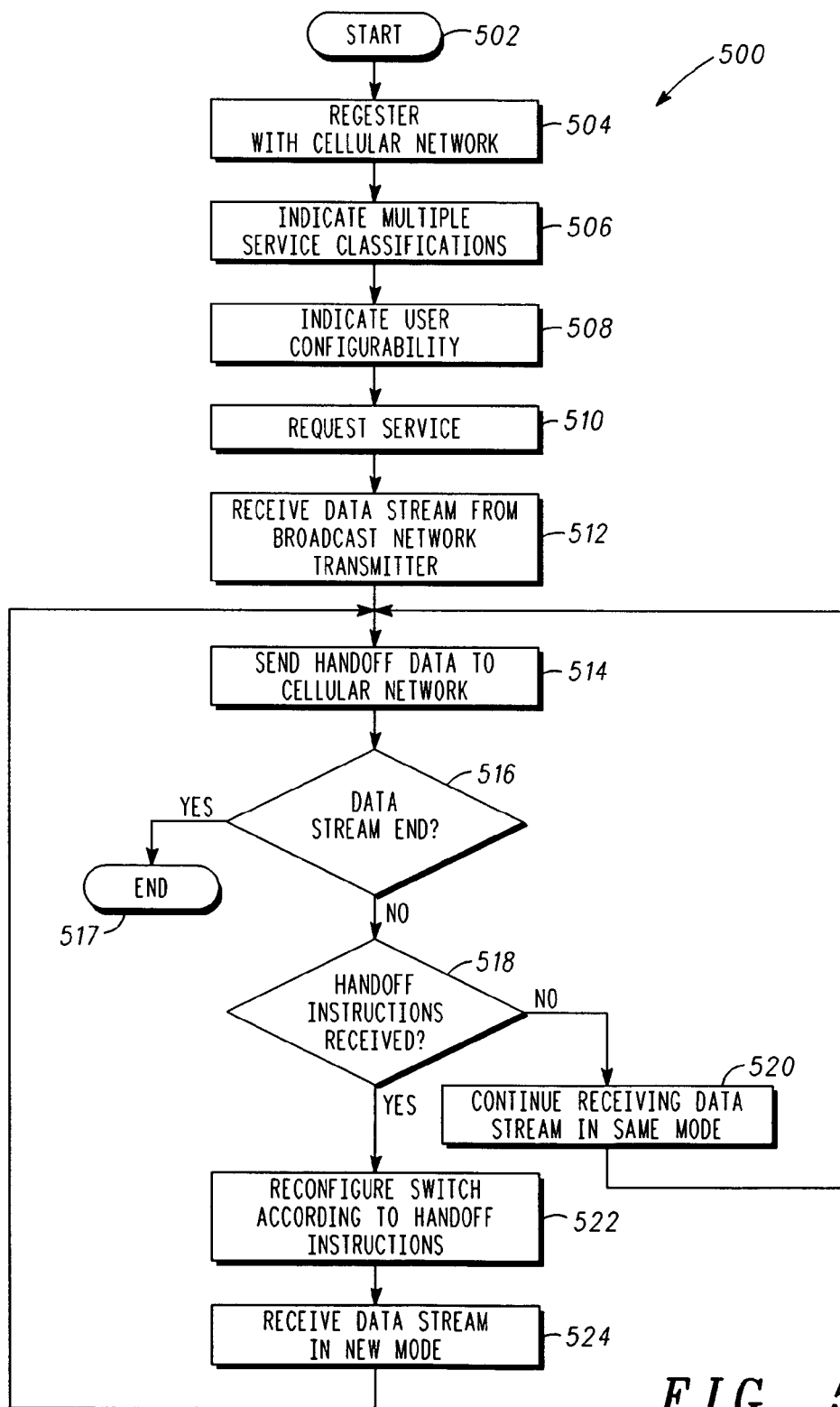
FIG. 5 shows a high-level flowchart of processes executed by a subscriber station that can be used in conjunction with the FIG. 1 communications system in accordance with one or more embodiments.

Referring now to the operation of the subscriber station, FIG. 5 depicts a high-level flowchart 500 of exemplary processes executed by portions of a subscriber station, such as subscriber station 108 shown in the system of FIG. 1, or executed by another similar apparatus, in accordance with one or more embodiments. As illustrated, the process begins at 502, and thereafter passes to 504 wherein the process registers subscriber station 108 with cellular network 104. During this process, subscriber station 108 can be authenticated by exchanging messages with core network 136.

Next, at 506, the process indicates to cellular network 104 that subscriber station 108 should be registered as having multiple service classifications. This indicates to cellular network 104, and in turn to cooperation platform 106, that subscriber station 108 is capable of receiving service data from broadcast network 102 in addition to being compatible with cellular network 104. Additionally, subscriber station 108 can indicate that it has a capability of handing off between broadcast network 102 and cellular network 104 under the control of, for example, controller 202 in cooperation platform 106.

As shown at 508, the process can further indicate to cellular network 104 that subscriber station 108 is capable of being configured by the user in response to a user-initiated handoff request. For example, subscriber station 108 can indicate that the user can initiate the handoff from subscriber station 108 with, for example, a button push or menu selection from the subscriber station user interface. In one embodiment, after the user presses such a handoff request button, the subscriber station can display a list of available distribution mechanisms from which the subscriber unit can receive the service data. For example, if the user is not satisfied with the quality of a broadcast using 64 QAM modulation, the user can be offered a choice of switching to a 32 QAM modulation, which is a modulation scheme that can work in noisier conditions or over longer distances. The user can also be offered to handoff to cellular network 104 to receive the service data from a high speed cellular data channel, such as a 3G (third generation) cellular data channel that operates at 384 kilobits per second, or a 3.5G High-Speed Downlink Packet Access (HSDPA) link. Once presented with these options, the user can select the desired network and/or transmission mode, and be subsequently handed off or reconfigured so that the user continues to receive the service data.

Next, as illustrated at 510, the user operating the subscriber station requests a service from, for example, broadcast content provider 110. This request for a service is typically a request to begin transmitting a stream of service data, which can be data for playing a movie, or music, or other similar data service described above. This user request can be implemented by a user input into the user interface of the subscriber station, or alternatively, the service request can be executed automatically, such as in response to a pre-programmed service request in subscriber station 108. Once the user enters a request into subscriber station 108, the request can be transferred to the broadcast content provider via control signals 134 and 114 (or 120) forwarded by cooperation platform 106, or by another suitable control signal link.

After the service has been requested, the process in the subscriber station receives a data stream of the service data from the broadcast network transmitter, as depicted at 512. Although the example of FIG. 5 shows the data stream corresponding to service data 212 (see FIG. 2) beginning from broadcast network 102, the data stream may just as well begin from cellular network 104.

After the data stream begins, the process can also begin sending handoff information to the cellular network, as depicted at 514. Such handoff information—which is data used by controller 202 and subscriber trigger process 232 to determine whether a handoff is needed—can include location data from locator 308, user initiated handoff request data from user interface 310, or a battery status data and power consumption rate data from battery manager 312. In other subscriber stations 108, there can be additional handoff data sources, similar to handoff data sources 342.

Next, the process determines whether the stream of data corresponding to service data 212 has ended, as depicted at 516. If the data stream has ended, the process terminates as indicated at 517; however the process can be repeated as required, e.g., from 510 or 504. However, if the data stream has not ended, the process determines whether handoff instructions have been received from cellular network 104, as illustrated at 518. Such handoff instructions include data necessary to reconfigure switch 336 to change the reception of data from broadcast receiver 332 to cellular transceiver 328, or vice versa. The handoff instructions may also include data to configure formatter 340 so that it reformats data after switching between receivers 322 and 328. Handoff data can also include a time, or a frame number, or other coordinating information for setting the time when the handoff will occur.

In some embodiments, switch 336 can be configured to receive the data stream corresponding to service data from both broadcast receiver 332 and cellular transceiver 328. If both receivers are used, switch 336 can select the most reliable frames for output to media output device 338.

If handoff instructions have not been received, the process continues receiving the data stream in the same mode or configuration, as illustrated at 520, and iteratively returns to 514 to continue sending handoff information. If handoff instructions have been received, the process reconfigures switch 336, and possibly formatter 338, according to the configuration and the time specified in the received handoff instructions, as depicted at 522. After reconfiguring switch 336, the process begins receiving the data stream in the new mode, as shown at 524, and then iteratively returns to 514.

Figure 6:
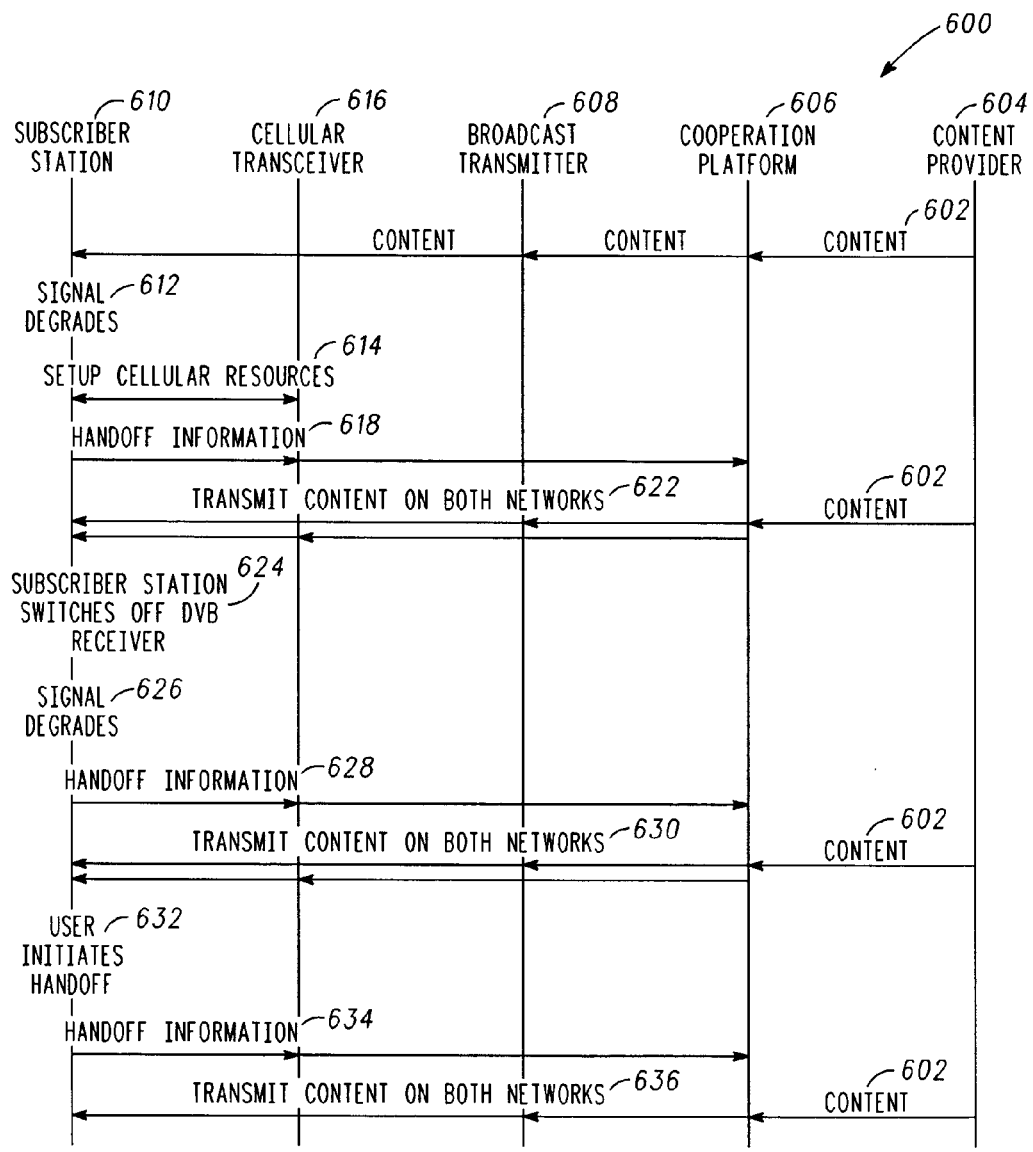
FIG. 6 depicts a schematic representation of messages and data transferred in conjunction with the system of FIG. 1 in accordance with one or more embodiments.

FIG. 6 shows a schematic representation of content data (i.e., service data) and control data that is passed between various components of data communications system 100 in accordance with one or more embodiments. As illustrated, content 602 (i.e., data corresponding to service data 212) is transferred from content provider 604 (such as broadcast content provider 110) to cooperation platform 606, and from cooperation platform 606 to broadcast transmitter 608, and finally to subscriber station 610. This transmission path is an example of a typical path between the content provider and the subscriber station before a handoff. The figure then shows a signal degradation 612 at subscriber station 610.

In response to the signal degradation 612, the subscriber station can set up cellular resources 614 with cellular transceiver 616 (i.e., cellular transceiver 138 in FIG. 1). The cellular resources 614 provides a data channel between subscriber station 610 and cellular transceiver 616 for sending and receiving information to trigger and set up a handoff. Next, handoff information 618 is transmitted from subscriber station 610 to cellular transceiver 616, and then transferred to cooperation platform 606.

When the handoff begins, content 602 can be transmitted on both the broadcast network 102 and the cellular network 104, as illustrated at 622. Eventually, content 602 is switched to transmit only from cellular transceiver 616. Once the handoff is complete, the subscriber station can switch off the broadcast receiver to conserve power, as shown at 624.

Sometime later, the signal from cellular transceiver 616 may degrade, as shown at 626, and the degraded signal condition can be reported in hand off information 628 sent from subscriber station 610 to cellular transceiver 616 and then to cooperation platform 606. In response to signal degradation 626, controller 202 in cooperation platform 106 can decide to transmit the service data 602 on both the broadcast network and the cellular network, as shown at 630.

At 632, the subscriber station user may initiate a handoff by pushing a button on subscriber station 610, or by otherwise interacting with the menus, or display, or other aspects of the user interface of the subscriber station. Handoff information 634 is transferred to cooperation platform 606 indicating the user-initiated handoff request. In response to the user-initiated handoff request, content 602 is transmitted only from broadcast transmitter 608, as indicated at 636.

The process of handing off the service data stream between the broadcast network and the cellular network can continue as illustrated by the examples shown in FIG. 6. Other triggering events may cause handoffs for other reasons. For example, handoff information can be reported back to cooperation platform indicating that the subscriber station has a low battery condition and that there is another available mode of transmission that would consume power at a lower rate. In response to this handoff information, controller 202 can instruct broadcast formatter 206 to decrease the frame rate of the service data so that fewer processing cycles are needed to receive and process the service data in subscriber station 108.

The above described functions and structures can be implemented in one or more integrated circuits. For example, many or all of the functions can be implemented in the signal and data processing circuitry that is suggested by the block diagrams shown in FIGS. 1, 2, and 3.

The processes, apparatus, and systems, discussed above, and the inventive principles thereof are intended to produce an improved and more reliable system for transmitting service data to a subscriber station. By more completely integrating the cellular network with the broadcast network using a cooperation platform, service data can be transmitted to a subscriber station efficiently and accurately with reduced degradation or lost data. Additional efficiencies are gained when the user of the subscriber station is allowed to initiate a handoff as he or she observes data degradation or loss.

This disclosure is intended to explain how to fashion and use various embodiments in accordance with the invention, rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for handing off between a broadcast network and a bidirectional network comprising:

receiving, in a cooperation platform, incoming data from a content provider;

sending, from the cooperation platform, broadcast data corresponding to the incoming data to a broadcast network output for broadcasting to one or more subscribers including a subscriber station;

receiving, in the cooperation platform, handoff information from the bidirectional network; and in response to the handoff information, sending, from the cooperation platform, bidirectional network data corresponding to the incoming data to a bidirectional network output for transmission to the subscriber station, wherein the handing off between the broadcast network and the bidirectional network is facilitated by the cooperation platform, and wherein the receiving, in the cooperation platform, handoff information from the bidirectional network comprises receiving, in the cooperation platform, handoff information corresponding to a user initiated request for handoff from the broadcast network to the bidirectional network sent from the subscriber station via the bidirectional network.

2. The method for handing off according to claim 1 wherein the receiving handoff information from the bidirectional network comprises receiving handoff information from a cellular network, and wherein the sending bidirectional network data corresponding to the incoming data to the bidirectional network output comprises sending cellular network data corresponding to the incoming data to a cellular network output.

3. The method for banding off according to claim 1 wherein the user initiated request for handoff sent from the subscriber station via the bidirectional network results from a user action at the subscriber station when the user no longer wants to be on the broadcast network.

4. The method for banding off according to claim 1 wherein the receiving, in the cooperation platform, handoff information from the bidirectional network comprises receiving, in the cooperation platform, a request for handoff sent from the bidirectional network based upon a location of the subscriber station.

5. The method for handing off according to claim 1 wherein the receiving, in the cooperation platform, handoff information from the bidirectional network comprises receiving, in the cooperation platform, a request for handoff sent from the bidirectional network based upon a loading level within one or more of the broadcast network and the bidirectional network.

6. A method for handing off between a broadcast network and a bidirectional network comprising: receiving, in a cooperation platform, incoming data from a content provider; sending, from the cooperation platform, broadcast data corresponding to the incoming data to a broadcast network output for broadcasting to one or more subscribers including a subscriber station; receiving, in the cooperation platform, handoff information from the bidirectional network; and in response to the handoff information, sending, from the cooperation platform, bidirectional network data corresponding to the incoming data to a bidirectional network output for transmission to the subscriber station, wherein the handing off between the broadcast network and the bidirectional network is facilitated by the cooperation platform, and wherein the receiving, in the cooperation platform, handoff information from the bidirectional network comprises receiving, in the cooperation platform, a user request for handoff from the broadcast network to the bidirectional network sent from the bidirectional network based upon a power level status of the power source of the subscriber station.

7. The method for handing off according to claim 1 further comprising formatting the incoming data from the content provider for transmission by a transceiver in the bidirectional network.

8. The method for handing off according to claim 1 further comprising formatting the incoming data from the content provider for transmission by a broadcast transmitter in the broadcast network in response to the handoff information.

9. The method for handing off according to claim 1. comprising stopping, in response to the handoff information, the sending, to the broadcast network output, the broadcast data corresponding to the incoming data.

10. The method for handing off according to claim 9 comprising sending, in response to updated handoff information, broadcast data corresponding to the incoming data to the broadcast network output for broadcast to the subscriber station.

11. A system for handing off between a broadcast network and a cellular network comprising:
  a switch having an incoming data input for receiving content, a broadcast data output to provide broadcast data corresponding to the incoming data, and a cellular data output to provide bidirectional data corresponding to the incoming data; and
  a controller coupled to the switch and configured to control the switch in response to handoff information received from the cellular network,
  wherein the switch and the controller facilitate the banding off between the broadcast network and the cellular network, and
  wherein the controller includes a handoff trigger processor for processing the handoff information and determining whether to handoff, the handoff information based on at least one of a user request for handoff between the broadcast network and the cellular network sent from a subscriber station and a power level status of a power source of the subscriber station.

12. The system for handing off according to claim 11 further comprising a cellular formatter having an input coupled to the cellular data output of the switch, an output coupled to a cellular network output, and a control input coupled to the controller.

13. The system for handing off according to claim 11 further comprising a broadcast formatter having an input coupled to the broadcast data output of the switch, an output coupled to a broadcast network output, and a control input coupled to the controller.

14. The system for banding off according to claim 11 wherein the power level status of a power source of the subscriber station includes a battery charge level.

* * * * *

UNITED STATES PATENT AND TRADEMARK OFFICE
CERTIFICATE OF CORRECTION

| | | |
|---|---|---|
| PATENT NO. | : 8,086,234 B2 | Page 1 of 1 |
| APPLICATION NO. | : 11/413533 | |
| DATED | : December 27, 2011 | |
| INVENTOR(S) | : Lizy Paul et al. | |

It is certified that error appears in the above-identified patent and that said Letters Patent is hereby corrected as shown below:

Column 12 line 63 after the word "for" please delete "banding" and insert --handing--
Column 13 line 1 after the word "for" please delete "banding" and insert --handing--
Column 14 line 18 after the words "facilitate the" please delete "banding" and insert --handing--

Signed and Sealed this
Eleventh Day of September, 2012

David J. Kappos
*Director of the United States Patent and Trademark Office*